US008874430B2

(12) United States Patent
Al-Omari et al.

(10) Patent No.: US 8,874,430 B2
(45) Date of Patent: *Oct. 28, 2014

(54) APPLICATIONS FOR ENCODING AND DECODING MULTI-LINGUAL TEXT IN A MATRIX CODE SYMBOL

(75) Inventors: Hussein K. Al-Omari, Riyadh (SA); Mohammad S. Khorsheed, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 747 days.

This patent is subject to a terminal disclaimer.

(21) Appl. No.: 13/163,676

(22) Filed: Jun. 18, 2011

(65) Prior Publication Data
US 2012/0253787 A1 Oct. 4, 2012

Related U.S. Application Data

(63) Continuation-in-part of application No. 13/077,827, filed on Mar. 31, 2011, now Pat. No. 8,670,976.

(51) Int. Cl.
G06F 17/20 (2006.01)
G06F 17/30 (2006.01)
G06F 17/22 (2006.01)

(52) U.S. Cl.
CPC ...... *G06F 17/2223* (2013.01); *G06F 17/30879* (2013.01)
USPC ..... 704/8; 235/435; 235/462.01; 235/462.09; 235/494; 382/100

(58) Field of Classification Search
CPC ............ G06K 19/06037; G06K 1/121; G06K 7/1095; G06F 21/6245; H04N 21/25816; H04N 21/41407
USPC ...................... 704/7, 8; 235/375; 705/4, 5, 39
See application file for complete search history.

(56) References Cited

U.S. PATENT DOCUMENTS

| 8,045,219 | B2 * | 10/2011 | Pruden et al. | 358/1.9 |
| 8,676,273 | B1 * | 3/2014 | Fujisaki | 455/567 |
| 2004/0246529 | A1 * | 12/2004 | Pruden et al. | 358/3.28 |
| 2005/0184159 | A1 * | 8/2005 | Hattori et al. | 235/462.45 |

(Continued)

OTHER PUBLICATIONS

H. Kato et al., "2D Barcodes for Mobile Phones", 2005, IEEE, pp. 1-8.*

*Primary Examiner* — Douglas Godbold
*Assistant Examiner* — Mark Villena
(74) *Attorney, Agent, or Firm* — SV Patent Service

(57) ABSTRACT

A method for preparing a multi-lingual personal identification card includes receiving a multi-lingual text comprising Latin-based characters in a Latin-based language and non-Latin-based characters in a non-Latin-based language. The multi-lingual text includes the name of the holder of the personal identification card in the Latin-based language and the non-Latin-based language. The method converts the non-Latin-based characters in the multi-lingual text to index values to produce a pseudo text. The conversion is based on a predefined mapping that converts the Unicode values of the non-Latin-based characters to index values having fewer digits than the corresponding Unicode values of the non-Latin-based characters. The method receives vector data for a personal image which includes a facial image, a finger print, or a combination of both of the holder of the personal identification card, and encodes the pseudo text and the vector data in the matrix-code symbol.

20 Claims, 15 Drawing Sheets

(56) References Cited

U.S. PATENT DOCUMENTS

| | | |
|---|---|---|
| 2008/0224823 A1* | 9/2008 | Lawson et al. .................. 340/5.8 |
| 2008/0296393 A1* | 12/2008 | Jovanovski et al. ..... 235/472.01 |
| 2009/0116741 A1* | 5/2009 | Emam et al. .................. 382/168 |
| 2009/0150193 A1* | 6/2009 | Hong et al. ....................... 705/5 |
| 2009/0171654 A1* | 7/2009 | Spain ................................ 704/7 |
| 2009/0172780 A1* | 7/2009 | Sukeda et al. .................... 726/3 |
| 2009/0261158 A1* | 10/2009 | Lawson ........................ 235/379 |
| 2010/0020970 A1* | 1/2010 | Liu et al. ........................ 380/255 |
| 2010/0306168 A1* | 12/2010 | Ostad et al. .................... 707/603 |
| 2010/0315248 A1* | 12/2010 | Townsend et al. ............ 340/635 |
| 2011/0125561 A1* | 5/2011 | Marcus ........................ 705/14.15 |
| 2012/0005076 A1* | 1/2012 | Dessert et al. .................. 705/39 |
| 2012/0159563 A1* | 6/2012 | Gomez et al. .................. 725/132 |
| 2012/0199643 A1* | 8/2012 | Minnick et al. ................ 235/375 |
| 2012/0209630 A1* | 8/2012 | Ihm et al. ......................... 705/4 |

* cited by examiner

| ASCII | Character | ASCII | Character |
|---|---|---|---|
| 32 |   | 54 | 6 |
| 33 | ! | 55 | 7 |
| 34 | " | 56 | 8 |
| 35 | # | 57 | 9 |
| 36 | $ | 58 | : |
| 37 | % | 59 | ; |
| 38 | & | 60 | < |
| 39 | ' | 61 | = |
| 40 | ( | 62 | > |
| 41 | ) | 63 | ? |
| 42 | * | 64 | @ |
| 43 | + | 65 | [ |
| 44 | , | 92 | \ |
| 45 | - | 93 | ] |
| 46 | . | 94 | ^ |
| 47 | / | 95 | _ |
| 48 | 0 | 96 | ` |
| 49 | 1 | 123 | { |
| 50 | 2 | 124 | \| |
| 51 | 3 | 125 | } |
| 52 | 4 | 126 | ~ |
| 53 | 5 |   |   |

Figure 3

| Arabic Character | Unicode Value | Numeric Index | Codeword Value | Arabic Character | Unicode Value | Numeric Index | Codeword Value |
|---|---|---|---|---|---|---|---|
| ء | 1563 | 00 | 130 | ط | 1591 | 28 | 158 |
| ◌ | 1564 | 01 | 131 | ظ | 1592 | 29 | 159 |
| ◌ | 1565 | 02 | 132 | ع | 1593 | 30 | 160 |
| ٮ | 1566 | 03 | 133 | غ | 1594 | 31 | 161 |
| ٯ | 1567 | 04 | 134 | ◌ | 1595 | 32 | 162 |
| ◌ | 1568 | 05 | 135 | ◌ | 1596 | 33 | 163 |
| ء | 1569 | 06 | 136 | ◌ | 1597 | 34 | 164 |
| آ | 1570 | 07 | 137 | ◌ | 1598 | 35 | 165 |
| أ | 1571 | 08 | 138 | ◌ | 1599 | 36 | 166 |
| ؤ | 1572 | 09 | 139 | ـ | 1600 | 37 | 167 |
| إ | 1573 | 10 | 140 | ف | 1601 | 38 | 168 |
| ئ | 1574 | 11 | 141 | ق | 1602 | 39 | 169 |
| ا | 1575 | 12 | 142 | ك | 1603 | 40 | 170 |
| ب | 1576 | 13 | 143 | ل | 1604 | 41 | 171 |
| ة | 1577 | 14 | 144 | م | 1605 | 42 | 172 |
| ت | 1578 | 15 | 145 | ن | 1606 | 43 | 173 |
| ث | 1579 | 16 | 146 | ه | 1607 | 44 | 174 |
| ج | 1580 | 17 | 147 | و | 1608 | 45 | 175 |
| ح | 1581 | 18 | 148 | ى | 1609 | 46 | 176 |
| خ | 1582 | 19 | 149 | ي | 1610 | 47 | 177 |
| د | 1583 | 20 | 150 | ◌ | 1611 | 48 | 178 |
| ذ | 1584 | 21 | 151 | ◌ | 1612 | 49 | 179 |
| ر | 1585 | 22 | 152 | ◌ | 1613 | 50 | 180 |
| ز | 1586 | 23 | 153 | ◌ | 1614 | 51 | 181 |
| س | 1587 | 24 | 154 | ◌ | 1615 | 52 | 182 |
| ش | 1588 | 25 | 155 | ◌ | 1616 | 53 | 183 |
| ص | 1589 | 26 | 156 | ◌ | 1617 | 54 | 184 |
| ض | 1590 | 27 | 157 | ◌ | 1618 | 55 | 185 |

Figure 4

```
~15761587160599  ~157516041604160799  ~15751604158515811605160699
~15751604158515811610160599
Dr. Hussein Al-Omari (~158399,  ~158115871610160699
~15751604159316051585161099)
Dr. Mohammad Khorsheed (~158399,  ~16051581160515839
~15831608158515881610158399)
~1573180899  ~15881575156999  ~157516041604160799
~158716101593158015761603999   ~16071584157599
~157516041580

```
~13344299 ~1241414499 ~12412218424399 ~12412218474299
Dr. Hussein Al-Omari (~2099, ~1824474399 ~12413042224799)
Dr. Mohammad Khorsheed (~2099, ~4218422099 ~19452225472099)
~104399 ~25120699 ~1241414499 ~2447301713409  ~44211299
~134117442099 ~12414215451227309  ~411920421499 ~124141311499
~1241303213471499
~0899 ~1399 ~1599 ~1699 ~1799 ~1899 ~1999
```

```
~132442 12414144 124122194243 12412219474299
Dr. Hussein Al-Omari (~20. 18244743 124130422247)99
Dr. Mohammad Khorsheed (~20. 43184238 194532254720)99
~1043 251206 12414144 244730171340  442112 1241174420
1241421545122730  4119204214 1241413114 124130221347199
~08 13 15 16 17 18 1999
```

APPLICATIONS FOR ENCODING AND DECODING MULTI-LINGUAL TEXT IN A MATRIX CODE SYMBOL

RELATED APPLICATIONS

The present patent application is a continuation-in-part application and claims priority to commonly assigned U.S. patent application Ser. No. 13/077,827 "System and methods for encoding and decoding multi-lingual text in a matrix code symbol" filed Mar. 31, 2011, now U.S. Pat. No. 8,670,976 the content of which is incorporated herein by reference.

BACKGROUND OF THE INVENTION

The present application relates generally to technologies for encoding and decoding matrix code symbols which comprise multi-lingual text.

Matrix code symbols such as data matrix codes or QR code are widely used for storing text or data. Examples of the matrix codes symbols include two-dimensional (2D) and three-dimensional (3D) matrix codes. The 2D matrix codes are commonly referred as 2D barcodes. In 2D barcode systems, the data is encoded in a matrix of black and white cells which represent "0"s and "1"s. The text and data can be encoded in the matrix using various encoding techniques such as the American Standard Code for Information Interchange (ASCII). ASCII uses a 7-bit encoding scheme to define 128 characters. The ASCII values of English characters are between 000 and 127. Each English character is encoded by one codeword with codeword values ranging from 1 to 128, which are their respective ASCII values plus 1. It takes one byte in ASCII value to represent each English character.

One drawback of the ASCII standard is that it was limited to a single Latin-based language such as English. Unicode was introduced to represent other languages that were difficult to represent using the 128 character set. Unicode supports multilingual computer processing by representing each character with 2 bytes, which consumes a lot of space to represent text in the two dimensional matrix code. Moreover, the amount of information that the 2D data matrix can hold decreases when the text comprises multiple languages such as Arabic and English, or Japanese and French.

There is therefore a need for a method to provide encoding and decoding of bilingual text in matrix code symbols with increased data capacity compared to conventional matrix code techniques.

SUMMARY OF THE INVENTION

In one aspect, the present invention relates to a method for encoding a multi-lingual text in a matrix code symbol. The method includes receiving, by a computer processor, a multi-lingual text comprising Latin-based characters in a Latin-based language and non-Latin-based characters in a non-Latin-based language; converting, by the computer processor, the non-Latin-based characters in the multi-lingual text to index values to produce a pseudo text, wherein the conversion is based on a predefined mapping that converts the Unicode values of the non-Latin-based characters to index values having fewer digits than the corresponding Unicode values of the non-Latin-based characters; and encoding the pseudo text in a matrix-code symbol.

Implementations of the system may include one or more of the following. At least some of the index values can include two digits. At least some of the index values can include three digits. The non-Latin-based language can include Arabic, Urdu, or Farsi. The Latin-based language can include English, French, Spanish, German, or Italian. The method can further include inserting one or more separation markers between the index values of the non-Latin-based characters and the Latin-based characters in the pseudo text. The step of inserting one or more separation markers can include: inserting a first separation marker at the beginning of a non-Latin text comprising non-Latin-based characters in the pseudo text; and inserting a second separation marker at the end of the non-Latin text in the pseudo text. One or more punctuation marks can be common to the non-Latin-based language and the Latin-based language, wherein the one or more punctuation marks are positioned among non-Latin-based characters, wherein the one or more separation markers are not inserted between the one or more punctuation marks and the adjacent non-Latin-based characters. The one or more punctuation marks can include ',' ';', and '?'. The step of encoding can include: encoding the index values in the matrix-code symbol; and converting the Latin-based characters in the pseudo text to Unicode values and ASCII values, which are encoded in the matrix-code symbol.

In another aspect, the present invention relates to method for decoding a matrix code symbol that encodes a multi-lingual text. The method includes decoding, by a computer processor, a matrix-code symbol to extract a pseudo text that includes a Latin-based characters and index values representing non-Latin-based characters, wherein the index values of the non-Latin-based characters have fewer digits than the respective Unicode values of the non-Latin-based characters according to a predefine mapping; and converting the index values in the pseudo text to the non-Latin-based characters according to the predefine mapping to produce a multi-lingual text comprising the Latin-based characters and to the non-Latin-based characters.

The method can further include identifying separation markers between the index values for the non-Latin-based characters and the Latin-based characters in the pseudo text before the step of decoding.

In another general aspect, the present invention relates to a system for encoding a multi-lingual text in a matrix code symbol. The system includes a computer storage configured to store a predefined mapping that converts the Unicode values of non-Latin-based characters in a non-Latin-based language to index values having fewer digits than the corresponding Unicode values of the non-Latin-based characters; and one or more computer processors configured to receive a multi-lingual text comprising Latin-based characters in a Latin-based language and non-Latin-based characters in the non-Latin-based language, to convert the non-Latin-based characters in the multi-lingual text to the index values to produce a pseudo text according to the predefine mapping, and to encode the pseudo text in a matrix-code symbol.

In another general aspect, the present invention relates to a method for preparing a multi-lingual personal identification card. The method includes receiving, by a computer processor, a multi-lingual text comprising Latin-based characters in a Latin-based language and non-Latin-based characters in a non-Latin-based language, wherein the multi-lingual text comprises the name of the holder of the personal identification card in the Latin-based language and the non-Latin-based language; converting, by the computer processor, the non-Latin-based characters in the multi-lingual text to index values to produce a pseudo text, wherein the conversion is based on a predefined mapping that converts the Unicode values of the non-Latin-based characters to index values having fewer digits than the corresponding Unicode values of the non-Latin-based characters; receiving vector data for a personal image which includes a facial image, a finger print, or a combination of both of the holder of the personal identification card; and encoding the pseudo text and the vector data in the matrix-code symbol.

Implementations of the system may include one or more of the following. The facial image and the finger print may not be printed on the multi-lingual personal identification card. At least some of the index values can have two digits or three digits. The non-Latin-based language can include Arabic, Urdu, or Farsi. The Latin-based language can include English, French, Spanish, German, or Italian. The method can further include inserting one or more separation markers between the index values of the non-Latin-based characters and the Latin-based characters in the pseudo text. The step of encoding can include encoding the index values in the matrix-code symbol; and converting the Latin-based characters in the pseudo text to Unicode values and ASCII values, which are encoded in the matrix-code symbol.

In another general aspect, the present invention relates to a method for communicating news content. The method includes receiving, by a computer processor, a multi-lingual text comprising Latin-based characters in a Latin-based language and non-Latin-based characters in a non-Latin-based language, wherein the multi-lingual text comprises information about a news content; converting, by the computer processor, the non-Latin-based characters in the multi-lingual text to index values to produce a pseudo text, wherein the conversion is based on a predefined mapping that converts the Unicode values of the non-Latin-based characters to index values having fewer digits than the corresponding Unicode values of the non-Latin-based characters; encoding the pseudo text in a matrix-code symbol; enabling a tagline about the news content to be displayed on a TV screen; and enabling the display of the matrix-code symbol in conjunction with the description about the news content on the TV screen, wherein the matrix code is configured to be decoded to allow a user to find more detailed description than the tagline about the news content.

Implementations of the system may include one or more of the following. At least some of the index values can have two digits or three digits. The non-Latin-based language can include Arabic, Urdu, or Farsi. The Latin-based language can include English, French, Spanish, German, or Italian. The method can further include inserting one or more separation markers between the index values of the non-Latin-based characters and the Latin-based characters in the pseudo text. The step of encoding can include encoding the index values in the matrix-code symbol; and converting the Latin-based characters in the pseudo text to Unicode values and ASCII values, which are encoded in the matrix-code symbol. The matrix-code symbol can be encoded with a web address or a Uniform Resource Identifier (URI), from which is configured to provide a user with more detailed description than the tagline about the news content.

In another general aspect, the present invention relates to a method for providing a multi-lingual restaurant menu. The method includes printing information about food and drink items on a substrate; receiving, by a computer processor, a multi-lingual text comprising Latin-based characters in a Latin-based language and non-Latin-based characters in a non-Latin-based language, wherein the multi-lingual text comprises information about the food and drink items; converting, by the computer processor, the non-Latin-based characters in the multi-lingual text to index values to produce a pseudo text, wherein the conversion is based on a predefined mapping that converts the Unicode values of the non-Latin-based characters to index values having fewer digits than the corresponding Unicode values of the non-Latin-based characters; encoding the pseudo text in a matrix-code symbol; and printing the matrix-code symbol on the substrate to produce the multi-lingual restaurant menu.

Embodiments may include one or more of the following advantages. The present application provides systems and methods for encoding and decoding multi-lingual text in matrix code symbols with significantly increased information capacity and reduced costs. The multi-lingual text contained in the matrix code symbols can include a Latin-based language, such as English and French, and a non-Latin-based language, such as Arabic, Urdu, and Farsi. In some cases, the number of bilingual characters allowed in a matrix code can be increased by more than two times. The disclosed systems and methods are compatible with different matrix-code encoding techniques such as Data Matrix or QR Code.

The disclosed systems and methods are applicable to a wide range of applications while providing the benefits of high information density and compact area need for bilingual text. The applications include hardcopy printed materials as well as electronic displays.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIG. 3 shows the characters shared between Arabic and English, and the characters' English ASCII values (large boldface ASCII values are for English only).

FIG. 4 shows the mapping of Unicode values for Arabic characters into smaller numeric codes (00-99) and codeword values (130-229) used in different methods in the present application.

FIG. 7 shows a pseudo text converted from the Arabic-English bilingual text shown in FIG. 5 using a method in accordance with the present invention.

FIG. 8 shows a Datamatrix code symbol produced based on the pseudo text shown in FIG. 7.

DETAILED DESCRIPTION OF THE INVENTION

Figure 1:
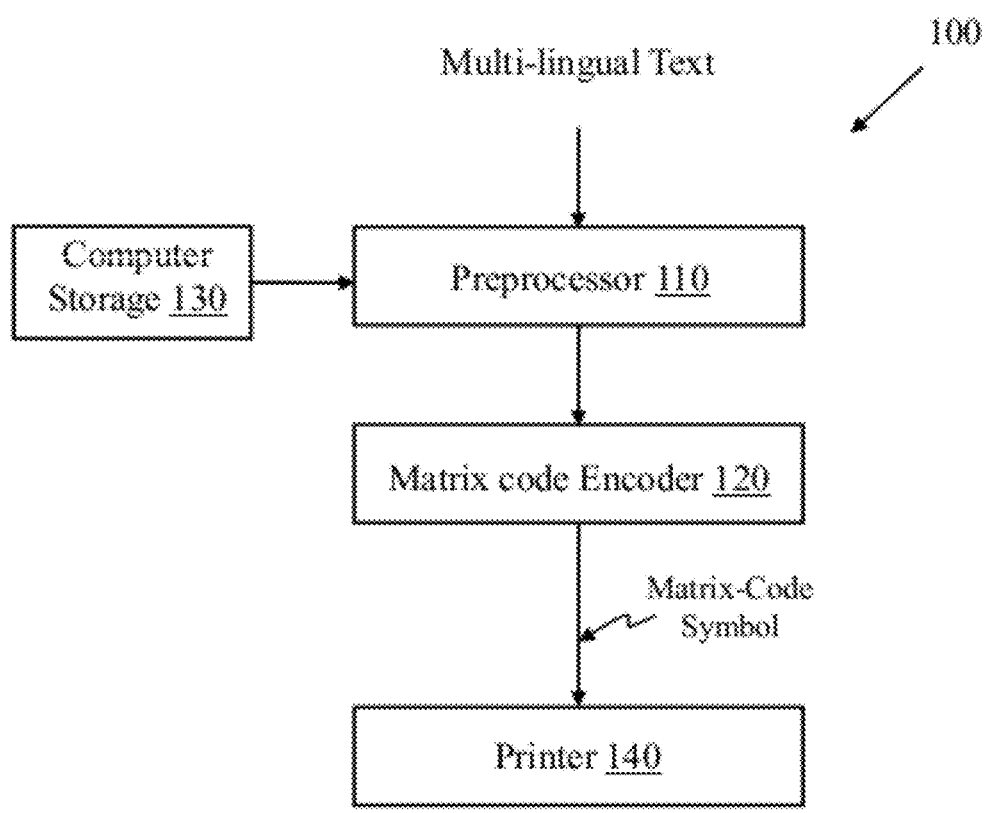
FIG. 1 is a block diagram for an exemplified matrix-code encoding system in accordance with the present invention.

Referring to FIG. 1, a matrix-code encoding system 100 includes a preprocessor 110, a matrix code encoder 120, and computer storage 130. The preprocessor 110 and the matrix code encoder 120 can be implemented by one or more computer processors. The computer storage 130 stores a predefined mapping for non-Latin-based characters. The preprocessor 110 receives a multi-lingual text, and converts the multi-lingual text into a pseudo text according to the predefined mapping. The pseudo text is received by the matrix code encoder 120, which produces image data for a matrix code symbol that contains information of the multi-lingual text. The matrix-code encoding system 100 can further include a printer 140, which is configured to receive the image data for the matrix code symbol and can print the matrix code symbol on an object.

Figure 2:
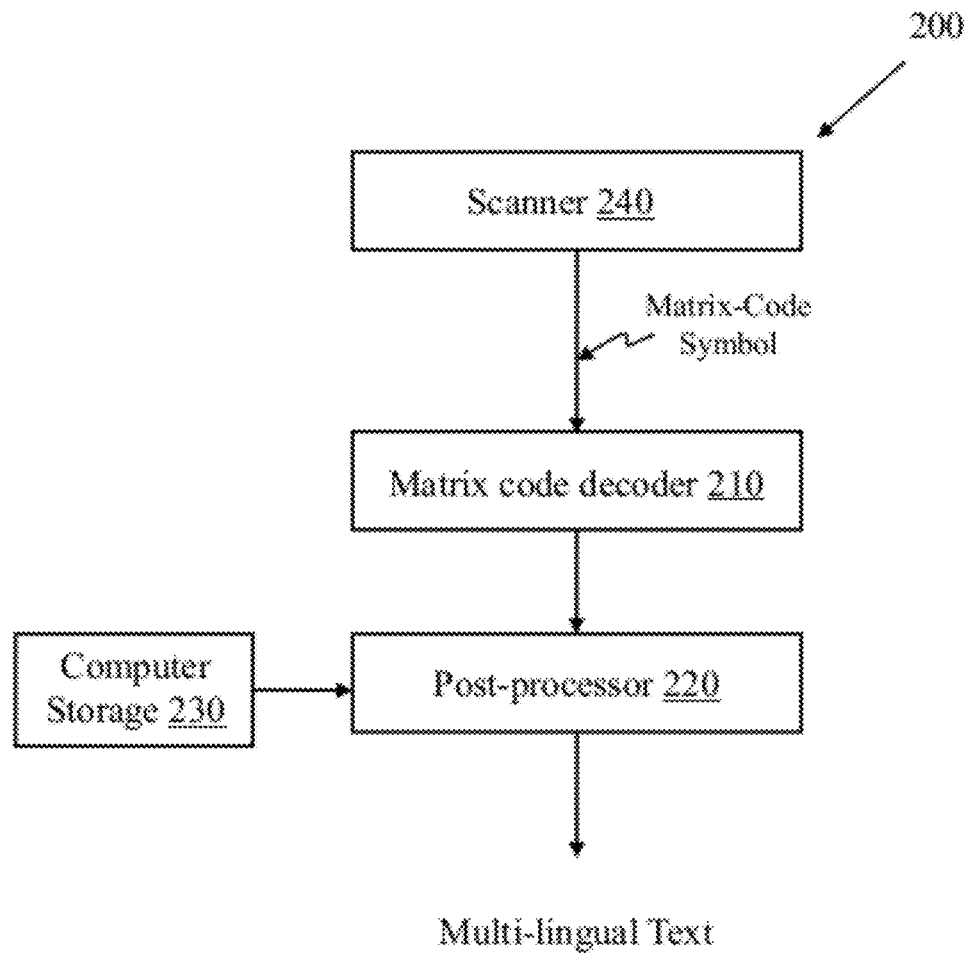
FIG. 2 is a block diagram for an exemplified matrix-code decoding system in accordance with the present invention.

Similarly, for the decoding path, referring to FIG. 2, a matrix-code decoding system 200 includes a matrix code decoder 210, a post-processor 220 and a computer storage 230. The matrix code decoder 210 and the post-processor 220 can be implemented by one or more computer processors. The computer storage 230 stores a predefined mapping for non-Latin-based characters. A matrix code symbol is encoded with information of the multi-lingual text by the matrix code encoding system 100. The matrix code symbol is input to the matrix code decoder 210, which decodes the matrix code symbol into a pseudo text. The post-processor 220 then converts the pseudo text to the multi-lingual text according to the predefined mapping. The matrix-code decoding system 200 can further include a scanner 240 that can retrieve the image of the matrix code symbol on an object and send the image to the matrix code decoder 210.

In the present application, the term and "matrix code symbol" is used to generally refer symbols in a matrix of black and white cells that represent "0"s and "1" to encode text and/or data. The matrix code encoder and decoder in the presently encoding and decoding systems can respectively use techniques compatible with Datamatrix Code, QR Code, 2D barcodes, and 3D barcodes, etc.

FIG. 3 shows the printable characters shared between Arabic and English with English ASCII values (large boldface ASCII values are for English only). The printable characters occupy the code words from 33 till 128.

Some no-Latin-based languages such as Arabic, Urdu, and Farsi have characters with high ASCII values. Combining English text with the texts of these languages is space consuming, which results in lower data capacity in the corresponding 2D barcodes in comparison to those comprising characters.

Several techniques are described in detail to improve the information capacity in matrix code symbols for encoding multi-lingual text.

Method 1. Encoding and Decoding Bilingual Text Comprising English and a Non-Latin-based Language in a Matrix Code Symbol Method 1 is applicable to languages with any number of printable characters. Each character in each of the language is mapped to an ASCII value having an even number of digits. If a character has an odd number of digits, one or more zero digits are added at the left of the ASCII value. After conversion, the number of digits of all characters in the first language should be the same as those of the character of the second language.

For example, each Arabic character takes two bytes or two codewords as opposed to one byte or one codeword for English. Referring to FIG. 4, Arabic characters have four-digit Unicode values ranging from 1563 to 1618. The preprocessor 110 (FIG. 1) first maps the Arabic characters are mapped to two-digit numeric index values having values from 00 to 55. Then the preprocessor 110 (FIG. 1) maps each pair of two-digit numeric index values from 00 to 55 to a codeword value between 130 and 229 (00-99 plus 130). The Arabic characters are mapped to three-digit codeword values from 130 to 185. Since the codeword values for the Arabic characters have distinct Unicode values, separation markers are not needed between the codeword values of adjacent Arabic characters. The mapping shown in FIG. 4 can be stored in the computer storage 130 (FIG. 1) and the computer storage 230 (FIG. 2).

It should be noted that the language can have more than 55 or more than 100 characters. For example, for a language having 120 characters, the codeword values can be mapped in a range from 130 to 249.

Next, the preprocessor 110 appends a pair of field separation markers at the beginning and the end of the numeric index values converted from the text in the second language. The separation marker can be a tilde '~' character with an ASCII value of 126, or the PAD character with a codeword value of 129. The Arabic text can be marked by a beginning separation marker "~" and an end separation marker "99". The text field for the second language is thus enclosed by the separation markers. The text in the first language (e.g. English) is outside of the separation markers. Thus a pseudo text is created with English characters outside the separation markers and the numeric index values for the Arabic characters inside the separation markers.

Figures 5, 6:
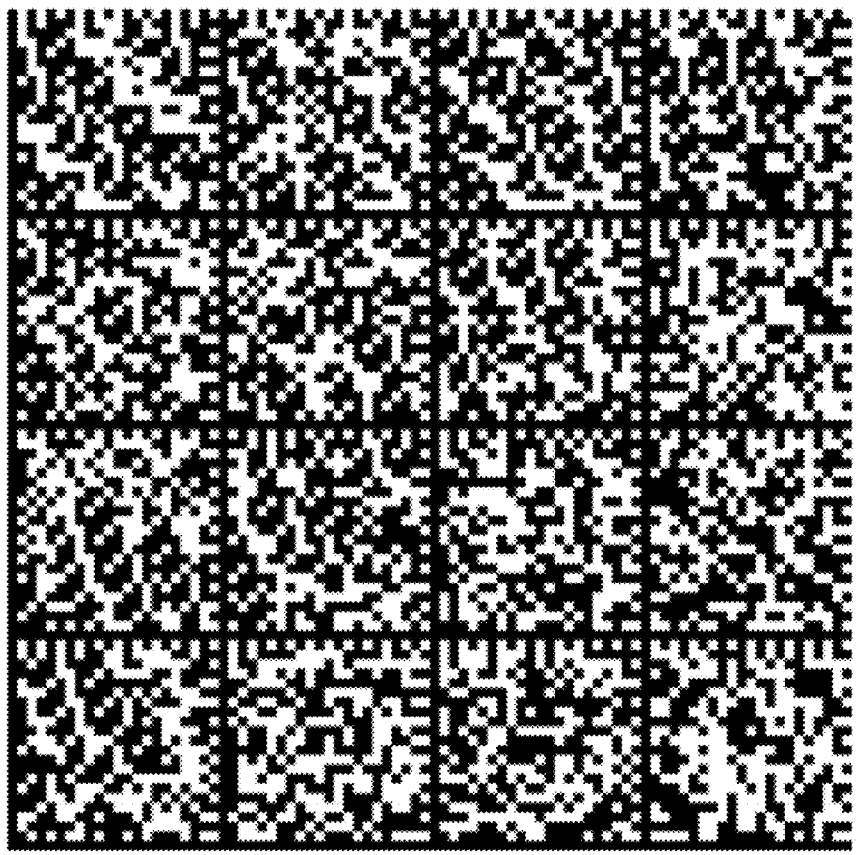
FIG. 5 shows an exemplified Arabic-English bilingual text to be encoded in a matrix code symbol.
FIG. 6 shows a Datamatrix code symbol produced based on the Arabic-English bilingual text shown in FIG. 5 using by conventional Unicode technique.

An example of an English-Arabic bilingual text is shown in FIG. 5. For comparisons, FIG. 6 shows a Datamatrix symbol created using conventional Unicode representations for the Arabic characters, which has the size of 88×88 cells.

The English-only pseudo text created by the preprocessor 110, shown in FIG. 7, includes a mixture of English characters and the codeword values converted from the Unicode values of the Arabic characters. The Arabic text is marked by a beginning separation marker "~" and an end separation marker "99". The Arabic characters have codeword values between 130 and 229.

The matrix code encoder 120 (FIG. 1) can produce a 72×72 Datamatrix symbol, as shown in FIG. 8, based in the English-only pseudo text in FIG. 6. The Datamatrix symbol encodes the codeword values and the separation markers. The matrix code encoder 120 converts the Latin-based (English) characters in the pseudo text to their respective standard Unicode or ASCII values, and encodes the Unicode or ASCII values in the matrix-code symbol.

Method 1 thus provides space saving and increase information density comparing to the 88×88 Datamatrix symbol in (FIG. 6) encoded by the conventional Datamatrix encoding using standard Unicode values for Arabic characters.

It should be noted that the matrix code encoder 120 (FIG. 2) can use other matrix code encoding techniques (e.g. QR Code, etc.) to produce data matrix symbols. Method 1 can improve information density or reduce symbol size for the same information compared to the respective conventional matrix encoding techniques.

The matrix code decoder 210 (FIG. 2) can decode a matrix code symbol (in FIG. 8) into a pseudo text with codeword values between separation markers (shown in FIG. 7) and English Unicode values outside the separation markers. The post processor 220 (FIG. 2) can identify these separation markers and convert the codeword values (ranging from 130 to 229) between the separation markers into Arabic characters (shown in FIG. 5). The post processor 220 (FIG. 2) can convert the ASCII or Unicode values outside of the separation markers using conventional ASCII indices for English characters.

Method 2. A More Space-efficient Method for Encoding and Decoding Bilingual Text Comprising English and a Non-Latin-based Language in a Matrix Code Symbol If the second language has fewer than 100 characters, the characters of the second language can be mapped to two-digit numeric index values ranging from 00 to 99 without the need of converting them to three-digit codeword values.

Similar to the Method 1, as shown in FIG. 4, Arabic characters having four-digit Unicode values from 1563 to 1618 are mapped by the preprocessor 110 (FIG. 1) to two-digit numeric index values ranging from 00 to 55. Different from the Method 1, two-digit numeric index values from 00 to 99 are not converted to codeword values between 130 and 229, which save additional space comparing to Method 1.

Next, similar to Method 1, the preprocessor 110 inserts a pair of field separation markers at the beginning and the end of the second language. The separation marker can be a tilde '~' character with an ASCII value of 126, or the PAD character with a codeword value of 129. The Arabic text can be marked by a beginning separation marker "~" and an end separation marker "99". The few digits for the Arabic characters result in spacing savings in the English-only pseudo text.

Figures 9, 10:
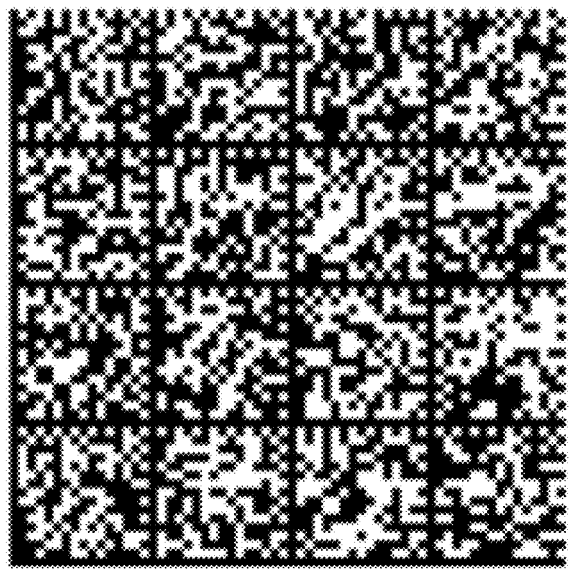
FIG. 9 shows a pseudo text converted from the Arabic-English bilingual text shown in FIG. 5 using another method in accordance with the present invention.
FIG. 10 shows a Datamatrix code symbol produced based on the pseudo text shown in FIG. 9.

For the same English-Arabic bilingual text as input (shown in FIG. 5), the English-only pseudo text created by the preprocessor 110 using Method 2 is shown in FIG. 8, which is markedly shorter than that shown in FIG. 6. The Arabic text is marked by a beginning separation marker "~" and an end separation marker "99". The Arabic characters have numeric index values between 00 and 99. The matrix code encoder 120 (FIG. 1) can produce, based in the English-only pseudo text in FIG. 9, a 64×64 Datamatrix symbol as shown in FIG. 10, which contains the same information but is smaller than the matrix-code symbol in FIG. 7.

Method 2 thus provides additional space saving and higher information density comparing to the 88×88 Datamatrix symbol in (FIG. 6) encoded by the conventional Datamatrix encoding using standard Unicode values for Arabic characters.

Similarly, the matrix code decoder 210 (FIG. 2) can decode a matrix code symbol (in FIG. 10) into the pseudo text with the numeric index values between separation markers (shown in FIG. 9) and English Unicode values outside the separation markers. The post processor 220 (FIG. 2) can identify these separation markers and convert the numeric index values (ranging from 00 to 99) between the separation markers into Arabic characters (shown in FIG. 5). The post processor 220 (FIG. 2) can convert the ASCII or Unicode values outside of the separation markers using conventional ASCII indices for English characters.

As shown, Method 2 improves information density comparing to Method 1 and can provide the same capacity in matrix codes for bilingual text as to matrix codes containing text in a single language.

Method 3. A Space-optimizing Method for Encoding and Decoding Bilingual Text Comprising English and a Non-Latin-based Language in a Matrix Code Symbol The methodology applies to mixing English with any language that has a total number of characters less than or equal to 100.

Most of the punctuation marks used in Arabic are the same as in English and have the same ASCII value is in English except for three marks (comma ',' semicolon ';', and question mark '?'). Since Method 2 treats these punctuation marks as English even when they occur between Arabic characters, which results in a pair of start and stop markers for each Arabic text string between the punctuation marks, hence producing a lot of overhead cost.

Method 3 further improves upon Method 2 by reducing these overhead cost, which is applicable to a single non-Latin-based language such as Arabic with Farsi or Urdu, or to a bilingual text comprising English and a non-Latin-based language. In Method 3, if the punctuation marks (i.e. ',' ';', and '?') that are common to Arabic and English occur within an Arabic text, separation markers are not inserted between Arabic characters, which significantly removes overhead costs for separation markers for short Arabic text strings between these common punctuation marks.

Figures 11, 12:
FIG. 11 shows a pseudo text converted from the Arabic-English bilingual text shown in FIG. 5 using yet another method in accordance with the present invention.
FIG. 12 shows a Datamatrix code symbol produced based on the pseudo text shown in FIG. 11.

For the same English-Arabic bilingual text as input (shown in FIG. 5), the English-only pseudo text created by the preprocessor 110 using Method 3 is shown in FIG. 11, which is shorter than that by Method 2 shown in FIG. 8. The Arabic characters have numeric codes between 00 and 99. The Arabic text is marked by a beginning separation marker "~" and an end separation marker "99", but Arabic text strings are longer because they are not interrupted by the punctuation marks (i.e. ',' ';', and '?'). The matrix code encoder 120 (FIG. 1) can produce, based in the English-only pseudo text in FIG. 10, a (52×52) Datamatrix symbol as shown in FIG. 12, which contains the same information but is smaller than the matrix-code symbol by Method 2 in FIG. 9.

Similarly, the matrix code decoder 210 (FIG. 2) can decode a matrix code symbol (in FIG. 12) into the pseudo text with numeric index values between separation markers (shown in FIG. 11) and English Unicode values outside the separation markers. The post processor 220 (FIG. 2) can identify these separation markers and convert the numeric index values (ranging from 00 to 99) between the separation markers into Arabic characters (shown in FIG. 5). The post processor 220 (FIG. 2) can convert the ASCII or Unicode values outside of the separation markers using conventional ASCII indices for English characters.

As shown, Method 3 improves information density comparing to Method 2 and can provide the higher data capacity in matrix codes for bilingual text even than matrix codes containing text in a single language using conventional methods.

For comparisons, the Datamatrix symbol (shown in FIG. 6) created for the bilingual text in FIG. 5 using conventional Unicode for Arabic characters has 88×88 cells in sizes. It is shown that for the same information content in the bi-lingual text in FIG. 5, the Datamatrix symbols respectively created by Method 1 (72×72 in FIG. 8), Method 2 (64×64 in FIG. 10), and Method 3 (52×52 in FIG. 12) are all smaller than the Datamatrix symbol created by the conventional Unicode technique.

It should be mentioned that Method 3 can give the smaller matrix-code symbols for Arabic/Farsi/Urdu text or a bilingual text. The Latin language can include English, French and other languages.

Figure 13:
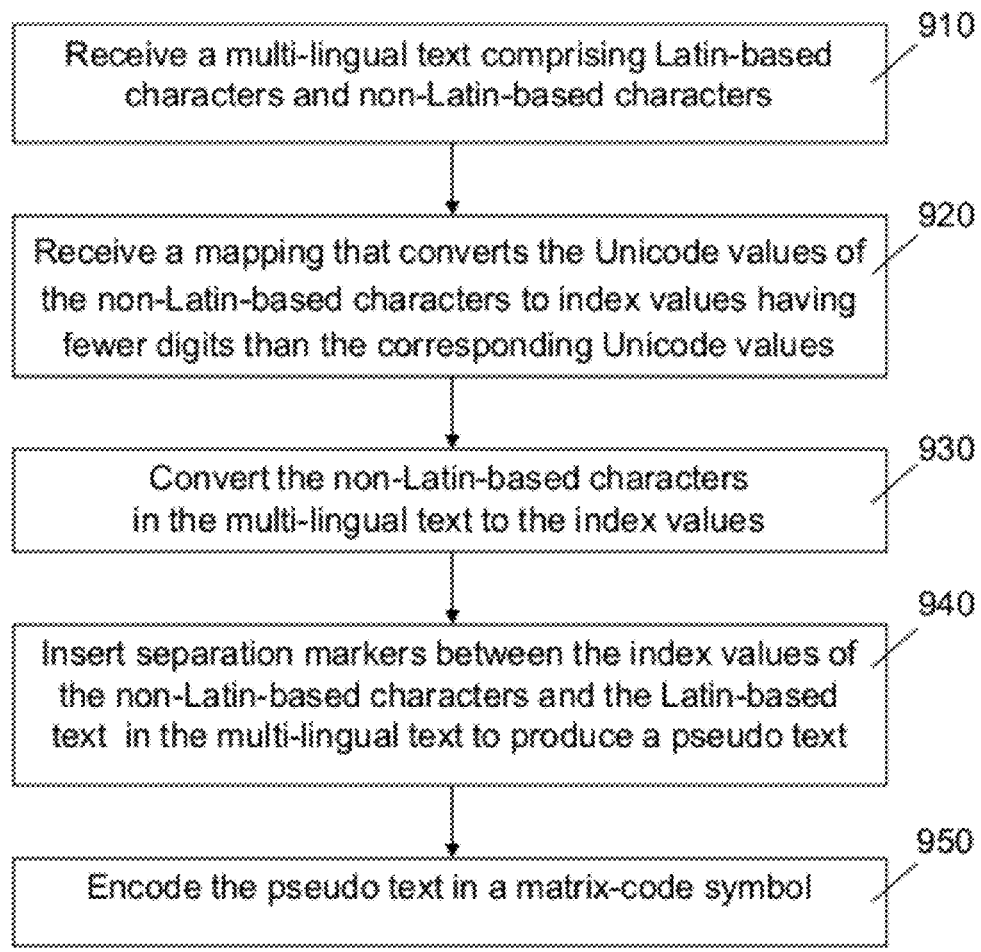
FIG. 13 is a flow diagram of a method for encoding a multi-lingual text comprising a non-Latin-based text in matrix-code symbols.

Referring to FIG. 13, the process of encode a multi-lingual text in a matrix-code symbol can include one or more of the following steps. First, a multi-lingual text is received (step 910). The multi-lingual text can include text in a Latin-based language such as English, French, Spanish, German, Italian, and a non-Latin-based language such as Arabic, Urdu, Farsi, Japanese, Chinese, etc.

A mapping is received (step 920), which specifies a conversion between the Unicode values for the characters in the non-Latin language and pre-defines index values that have fewer digits than the Unicode values for the non-Latin characters. The index values can include the two-digit numeric index values used in Methods 2-3, and the three-digit codeword values in Method 1, which all have fewer digits than the respective Unicode values of the non-Latin characters.

The non-Latin characters in the multi-lingual text are then converted to the index values (step 930) as described above in Methods 1-3.

Separation markers are inserted between the Latin-based text and the index values converted from the non-Latin-based characters (step 940). The separation markers can be added at the beginning and the end of the non-Latin-based text. Furthermore, as described in Method 3 above, separation markers are not needed if the punctuation marks, which are common to the Latin-based language and the non-Latin-based language, appear within the non-Latin-based text. A pseudo text is created, which comprises the Latin-based characters, index values converted from the non-Latin-based characters, and separation markers which separate Latin-based characters and the index values.

A matrix-code symbol is produced based on the pseudo text (step 950), which can use techniques such as Datamatrix Code or QR Code.

For decoding a matrix code symbol encoding a multi-lingual text, the matrix-code decoding system 200 (FIG. 2) the matrix-code symbol and decodes it to extract a pseudo text that includes a Latin-based characters and index values representing non-Latin-based characters according to a pre-define mapping. The index values of the non-Latin-based characters have fewer digits than the respective Unicode values of the non-Latin-based characters. Examples of the index values are the numeric index and codeword values shown in FIG. 4. The post-processor 220 (FIG. 2) can identify separation markers in the pseudo text and convert the index values enclosed by separation markers to non-Latin-based characters by the predefine mapping. The post-processor 220 (FIG. 2) converts the Unicode or ASCII values outside of the separation markers to Latin-based characters, which produces the multi-lingual text encoded in the matrix code symbol.

The above described systems and methods for the multi-lingual encoding in matrix codes can be applied to a wide range of applications. The disclosed systems and methods are applicable to a wide range of applications while providing the benefits of high information density and compact area need for bilingual text. The applications include hardcopy printed materials as well as electronic displays.

Bilingual Personal Identification Card

For example, in some regions, for cultural or religious reasons, people or a group of people do not want their facial images oriented personal identification cards (IDs). In Saudi Arabia, for example, women do not have their photos displayed on the identification cards, which leaves the IDs venerable for forgery. In some embodiments, a personal identification card includes a matrix-code symbol that encodes a bilingual text and an image. The bilingual text can include the name of the holder of the personal identification card in English and another language, which matches the bilingual text printed on the personal ID card. The image encoded in the matrix-code symbol can include a facial image or a fingerprint of the holder of the personal identification card. The image however is not printed on the personal identification card, which allows the personal identification cards to conform local culture. The bilingual text can include a non-Latin-based language such as Arabic, Urdu, or Farsi, and a Latin-based language such as English, French, Spanish, German, or Italian.

Figure 14:
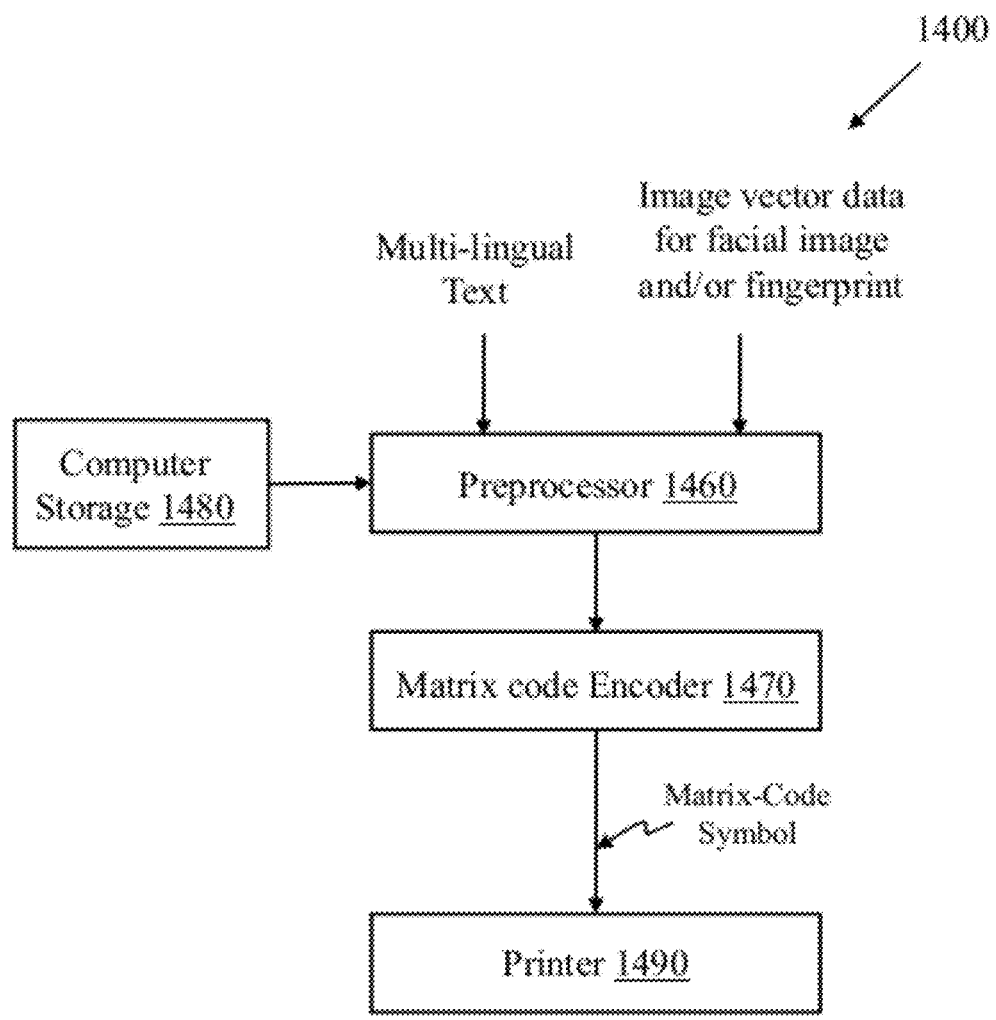
FIG. 14 shows a system for encoding the bilingual text and a facial image and/or a fingerprint of the holder of a personal identification card.

The personal identification card can be produced using a bilingual ID system 1400 shown in FIG. 14. The bilingual ID system 1400 includes a preprocessor 1460, a matrix code encoder 1470, and a computer storage 1480. The preprocessor 110 and the matrix code encoder 120 can be implemented by one or more computer processors. The computer storage 130 stores a predefined mapping for non-Latin-based characters. The preprocessor 110 receives a multi-lingual text, and converts the multi-lingual text into a pseudo text according to the predefined mapping. The preprocessor 110 also receives image vector data for facial image and/or fingerprint of the holder of the personal identification card. The pseudo text and the image vector data are received by the matrix code encoder 120, which produces image data for a matrix-code symbol that contains the multi-lingual text and the facial image and/or fingerprint. The matrix-code encoding system 100 can further include a printer 1490, which is configured to receive the matrix code symbol and other text on one or two faces of the personal identification card.

In usage, an officer at custom or other security check points can use a matrix-code scanner (e.g. a 2D barcode scanner) to scan to the matrix-code symbol to retrieve the bilingual text and the image information encoded in the matrix-code symbol. The names decoded from the matrix-code symbol match the bilingual names printed on the personal ID card. The officer can compare the encoded facial image to the ID holder's look. The officer can also use a fingerprint scanning device to capture an image of the ID holder's finger print. A computing device can automatically compare the newly captured fingerprint to finger print encoded in the matrix-code symbol on the ID card.

In some, above described systems and methods provide personal identification cards that are secure and usable in multiple languages while be in conformance with the local cultures.

Bilingual Matrix-code Symbol for TV News

Figure 15A:
FIG. 15A shows a screen shot of a TV news channel displaying a conventional news bar.

In a different application TV News channels, such as Aljazeera and CNN, often display one or more news bars at the bottom of the TV screens. For example, referring to FIG. 15A, a TV screen 1500 showing Aljazeera TV channel displays a thick stationary news bar 1510 that changes when a different news item is broadcasted. The TV screen 1500 also displays a thin news bar 1520 that changes every few seconds independent of the content shown on the main screen. The thick news bar 1510 can include a tagline for a news topic such as "Revolution in Libya", and a logo for the TV station. The tagline can alternate every few second between "Libya" and "The Revolution in Libya", both of which indicate the content currently broadcasted on the main screen.

Figure 15B:
FIG. 15B shows a screen shot of a TV news channel displaying a news bar comprising a matrix code encoded with bilingual text information in accordance with the present invention.

In some embodiments, referring to FIG. 15B, a TV screen 1550 can include a matrix-code symbol 1560 displayed on the thick news bar 1510. The matrix-code symbol 1560 can encode more detailed information about the news that is currently displayed in the thick new bar 1510. The matrix-code symbol 1560 can include a URL to a website at which he detailed news content is published. A user can use a camera phone to take a snapshot of the matrix-code symbol 1560 and extract detailed news content from the matrix-code symbol 1560 or directs to and displays the webpage at the URL link. The matrix-code symbol 1560 and its encoded information update every time the news content changes in the thick news bar. For one TV channel, the news can be encoded in English and Spanish in the matrix-code symbol 1560.

Figure 15C:
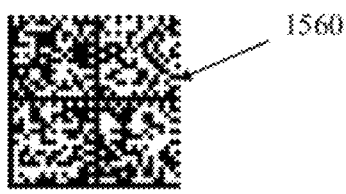
FIG. 15C shows a detailed view of the matrix code displayed in conjunction with the news bar in FIG. 15B.

For the Aljazeera TV channels, the news content can be encoded in Arabic and English in the matrix code. Referring to FIGS. 15B and 15C, the matrix-code symbol 1560 can encode text about a news item about Turkey. The matrix-code symbol 1560 is displayed with a tagline that briefly describes the news about Turkey, while the main news on the TV screen 1550 is about "Libyan Revolution". The news content encoded in the matrix-code symbol 1560 can be multi-lingual, which is encoded and decoded using the efficient multi-lingual encoding techniques as disclosed in FIGS. 1-13 and the related discussions above.

Bilingual Restaurant Menu

Figure 16A:
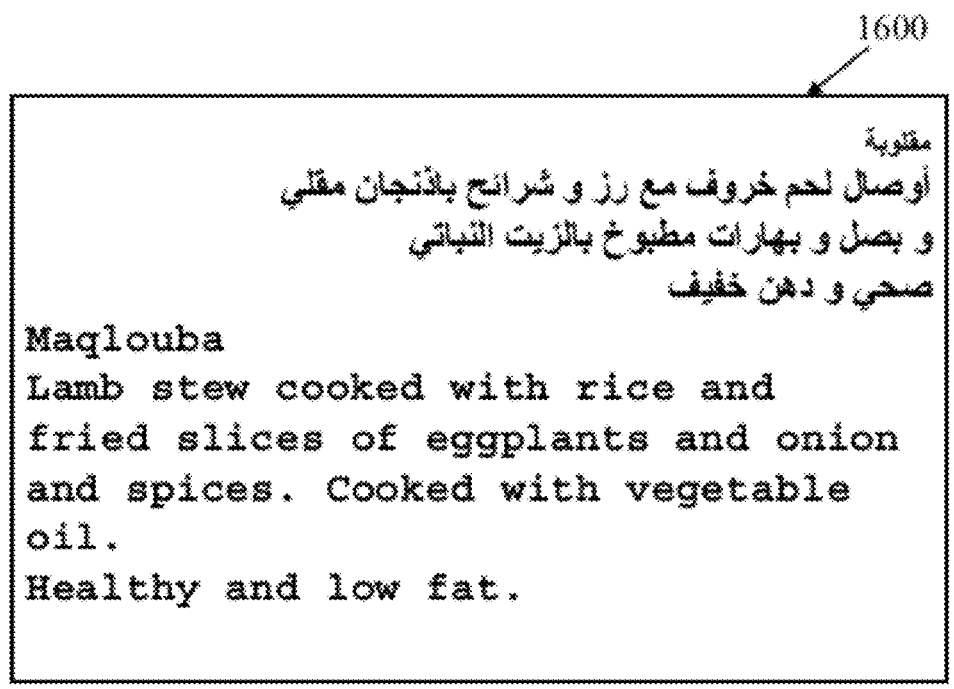
FIG. 16A shows a bilingual restaurant menu.

In some embodiments, referring to FIG. 16A, a portion of a bilingual restaurant menu 1600 displaying a dish called "Maqlouba" in Arabic and English. In English, the dish is described as the following: "Lamb stew cooked with rice and fried slices of eggplants and onion and spices. Cooked with vegetable oil. Healthy and low fat." The bilingual restaurant menu 1600 can be printed on paper, plastic, laminated sheet of materials, or other types of substrates. The bilingual restaurant menu 1600 can include information about food, drink, and the restaurant, or an Internet web address containing such information.

Figure 16B:
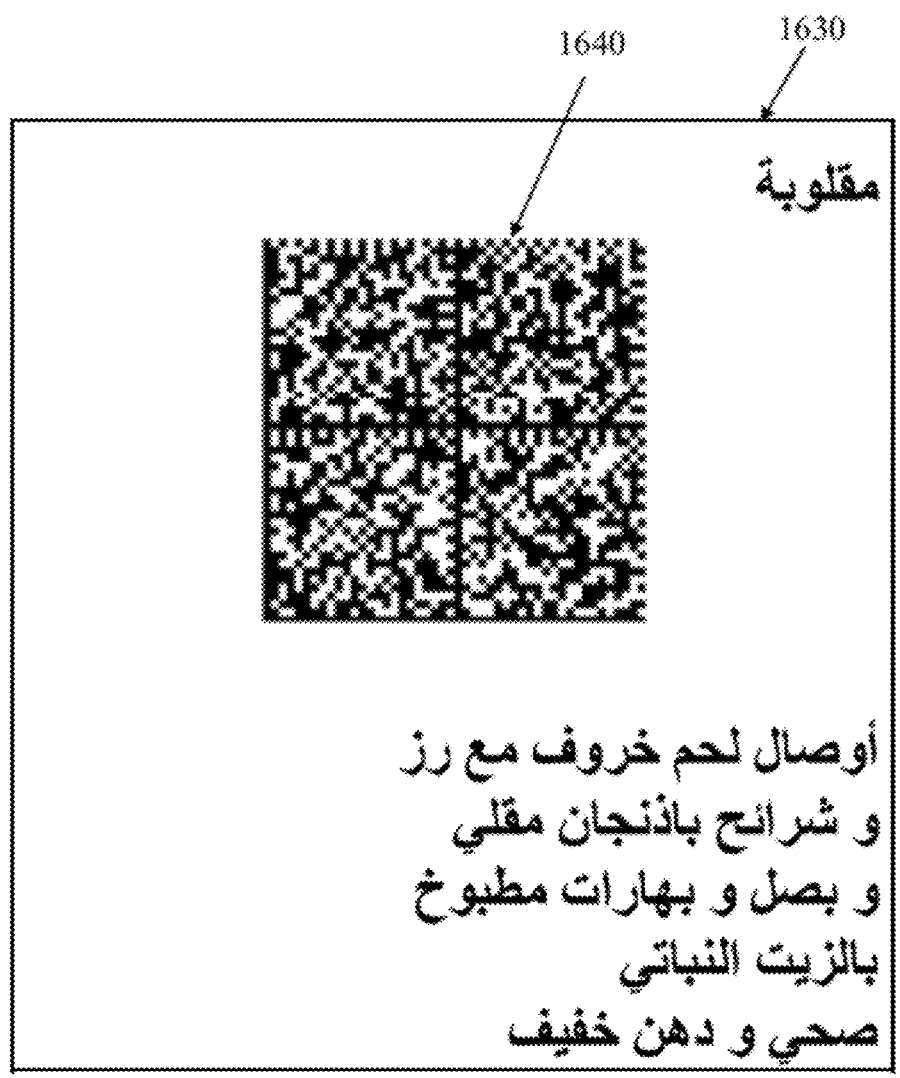
FIG. 16B illustrates a restaurant menu in Arabic and a matrix barcode encoded with bilingual text information.

In some embodiments, referring to FIG. 16B, a portion of an Arabic restaurant menu 1630 displays the dish "Maqlouba" in Arabic. A matrix-code symbol 1640 is encoded and printed on the Arabic restaurant menu 1630 using the systems and methods described above. Using the systems and methods described above, the matrix-code symbol 1640 can include bilingual text similar to those displayed in bilingual restaurant menu 1600 in FIG. 16A. The matrix-code symbol 1640 can also be encoded with more detailed information such as an Internet web address, and information about the restaurant, the chef, or the history of the dish. A user can use a mobile camera phone to capture an image of the matrix-code symbol 1640 to extract bilingual information encoded in the matrix-code symbol 1640. The customer can read details in either language about any item using the reader on the mobile phone to find out what the meal has and if it fits the taste or diet of the customer.

Figure 16C:
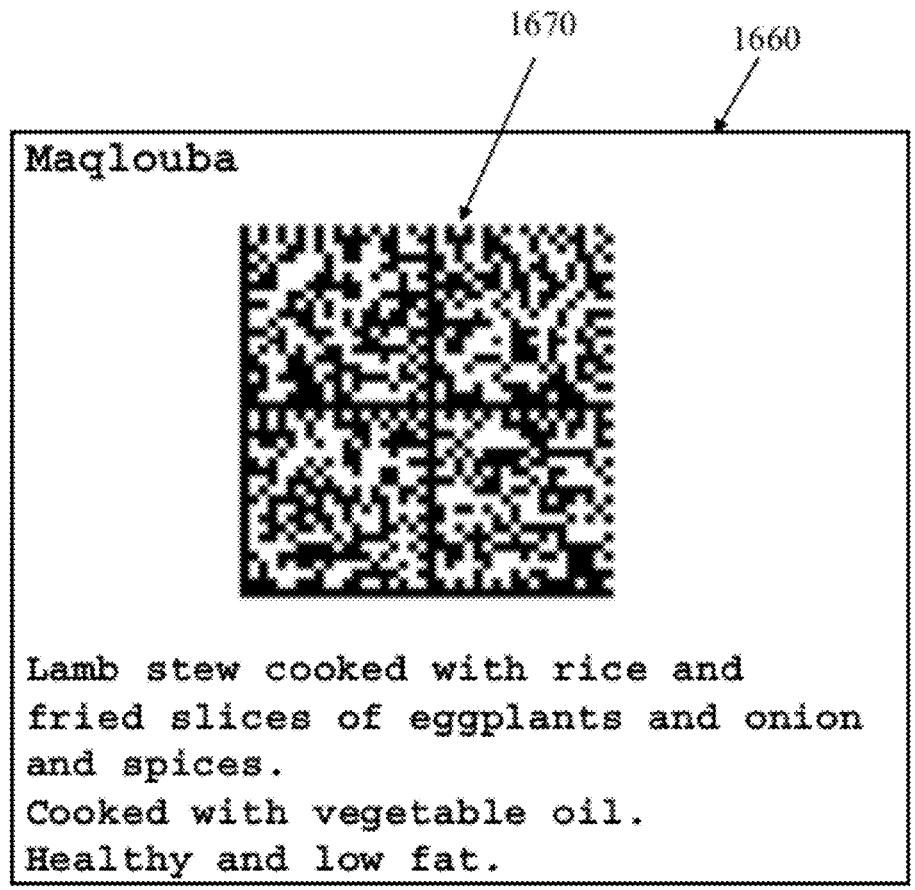
FIG. 16C illustrates a restaurant menu in English and a matrix barcode encoded with bilingual text information.

In some embodiments, referring to FIG. 16C, a portion of an English restaurant menu 1660 displays the dish "Maqlouba" in English. A matrix-code symbol 1670 is encoded and printed on the English restaurant menu 1660 using the systems and methods described above. The matrix-code symbol 1670 can include bilingual text similar to those displayed in bilingual restaurant menu 1600 in FIG. 16A. The matrix-code symbol 1670 can also be encoded with more detailed information such as an Internet web address, and information about the restaurant, the chef, or the history of the dish. A user can use a mobile camera phone to capture an image of the matrix-code symbol 1670 to extract bilingual information encoded in the matrix-code symbol 1670. The customer can read details in either language about any item using the reader on the mobile phone to find out what the meal has and if it fits the taste or diet of the customer.

Bilingual Business Card

In some embodiments, a bilingual business card can be prepared and printed using the matrix-code encoding system 100 in FIG. 1. The preprocessor 110 receives a multi-lingual text to be printed on the bilingual business card, and converts the multi-lingual text into a pseudo text according to the predefined mapping. The pseudo text is received by the matrix code encoder 120, which produces image data for a matrix code symbol that contains information of the multi-lingual text. The printer 140 can receive the image data for the matrix code symbol and print the matrix code symbol on the bilingual business card. The printer 140 can also print bilingual text on the same face or the opposite faces of the bilingual business card. The bilingual business card can for example be printed in English one on face and Arabic on the other.

A recipient of the bilingual business card can retrieve more detailed information by taking a picture of or scanning the matrix barcode on the bilingual business card. The recipient can also take a picture of the matrix-code symbol on the bilingual business card using his mobile phone and extract the person's name, institution, phone numbers, email address that are encoded in the matrix-code symbol, and automatically add the information in the phone book on his mobile phone.

Bilingual Business Advertisement

In some embodiments, a bilingual business advertisement can display a bilingual matrix-code symbol next to the text and image content in the bilingual business advertisement. A viewer can take a picture of the matrix-code symbol using a camera phone and extract the detailed advertisement information encoded in the matrix-code symbol using the systems and methods described above. The viewer can read detailed encoded information about the advertisement in any of the languages. The advertisement can be displayed on a newspaper, magazine, a billboard, or a flyer.

It should be understood that the above disclosed systems, methods, and applications are suitable not only with multi-lingual, but also with a single language that includes large Unicode values (e.g. 4 digits). If the language has less than 100 characters, the large Unicode values (e.g. 4 digits) can be down mapped to 2-digit Unicode numbers. If the language has less than 1000 characters, the large Unicode values (e.g. 4 digits) can be down mapped to 3-digit Unicode numbers. The down mapping can reduce data size for storing bilingual text information in the matrix-code symbol.

It should be understood that the above described methods are not limited to the specific examples used. Configurations can vary without deviating from the spirit of the invention. The disclosed methods are applicable to texting in a single non-Latin based language such as Arabic, Urdu, or Farsi. The disclosed methods are also applicable to multi-lingual texting comprising characters in Arabic, Urdu, or Farsi, and English or French, and other non-Latin and Latin based languages.

Furthermore, the disclosed matrix-code symbol encoding systems and methods are compatible with other matrix-code symbol encoding than Datamatrix symbol and QR Code as described above. The English-only pseudo text can be encoded in matrix-code symbols by other encoding techniques.

What is claimed is:

1. A method for preparing a multi-lingual personal identification card, comprising:

receiving, by a computer processor, a multi-lingual text comprising Latin-based characters in a Latin-based language and non-Latin-based characters in a non-Latin-based language, wherein the multi-lingual text comprises a name of a holder of the personal identification card in the Latin-based language and the non-Latin-based language;

converting, by the computer processor, the non-Latin-based characters in the multi-lingual text to index values to produce a pseudo text, wherein each of the non-Latin-based characters has a Unicode value two byte in length, wherein the index values are a single byte in length, wherein the conversion is based on a predefined mapping that converts the Unicode values of the non-Latin-based characters to index values having fewer digits than the corresponding Unicode values of the non-Latin-based characters, wherein the predefined mapping allocates at least 55 consecutive digital numbers for the index values, wherein the pseudo text includes the index values in co-existence with the Latin-based characters in a Latin-based language;

receiving vector data for a personal image which includes a facial image, a finger print, or a combination of both of the holder of the personal identification card; and encoding the pseudo text and the vector data in a matrix-code symbol.

2. The method of claim 1, wherein the facial image and the finger print are not printed on the multi-lingual personal identification card.

3. The method of claim 1, wherein at least some of the index values comprise two digits or three digits.

4. The method of claim 1, wherein the non-Latin-based language comprises Arabic, Urdu, or Farsi.

5. The method of claim 1, wherein the Latin-based language comprises English, French, Spanish, German, or Italian.

6. The method of claim 1, further comprising:
inserting one or more separation markers between the index values of the non-Latin-based characters and the Latin-based characters in the pseudo text.

7. The method of claim 1, wherein the step of encoding comprises:
encoding the index values in the matrix-code symbol; and
converting the Latin-based characters in the pseudo text to Unicode values and ASCII values, which are encoded in the matrix-code symbol.

8. A method for communicating news content, comprising:
receiving, by a computer processor, a multi-lingual text comprising Latin-based characters in a Latin-based language and non-Latin-based characters in a non-Latin-based language, wherein the multi-lingual text comprises information about a news content;
converting, by the computer processor, the non-Latin-based characters in the multi-lingual text to index values to produce a pseudo text, wherein each of the non-Latin-based characters has a Unicode value two byte in length, wherein the index values are a single byte in length, wherein the conversion is based on a predefined mapping that converts the Unicode values of the non-Latin-based characters to index values having fewer digits than the corresponding Unicode values of the non-Latin-based characters, wherein the predefined mapping allocates at least 55 consecutive digital numbers for the index values, wherein the pseudo text includes the index values in co-existence with the Latin-based characters in a Latin-based language;
encoding the pseudo text in a matrix-code symbol;
enabling a tagline about the news content to be displayed on a TV screen; and
enabling the display of the matrix-code symbol in conjunction with the description about the news content on the TV screen, wherein the matrix code is configured to be decoded to allow a user to find more detailed description than the tagline about the news content.

9. The method of claim 8, wherein at least some of the index values comprise two digits or three digits.

10. The method of claim 8, wherein the non-Latin-based language comprises Arabic, Urdu, or Farsi.

11. The method of claim 8, wherein the Latin-based language comprises English, French, Spanish, German, or Italian.

12. The method of claim 8, further comprising:
inserting one or more separation markers between the index values of the non-Latin-based characters and the Latin-based characters in the pseudo text.

13. The method of claim 8, wherein the step of encoding comprises:
encoding the index values in the matrix-code symbol; and
converting the Latin-based characters in the pseudo text to Unicode values and ASCII values, which are encoded in the matrix-code symbol.

14. The method of claim 8, wherein the matrix-code symbol is encoded with a web address or a Uniform Resource Identifier (URI), from which is configured to provide a user with more detailed description than the tagline about the news content.

15. A method for providing a multi-lingual restaurant menu, comprising:
printing information about food and drink items on a substrate;
receiving, by a computer processor, a multi-lingual text comprising Latin-based characters in a Latin-based language and non-Latin-based characters in a non-Latin-based language, wherein the multi-lingual text comprises information about the food and drink items;
converting, by the computer processor, the non-Latin-based characters in the multi-lingual text to index values to produce a pseudo text, wherein each of the non-Latin-based characters has a Unicode value two byte in length, wherein the index values are a single byte in length, wherein the conversion is based on a predefined mapping that converts the Unicode values of the non-Latin-based characters to index values having fewer digits than the corresponding Unicode values of the non-Latin-based characters, wherein the predefined mapping allocates at least 55 consecutive digital numbers for the index values, wherein the pseudo text includes the index values in co-existence with the Latin-based characters in a Latin-based language;
encoding the pseudo text in a matrix-code symbol; and
printing the matrix-code symbol on the substrate to produce the multi-lingual restaurant menu.

16. The method of claim 15, wherein the matrix code is encoded information about one or more of food, a restaurant, or an Internet web address.

17. The method of claim 15, wherein at least some of the index values comprise two digits or three digits.

18. The method of claim 15, wherein the non-Latin-based language comprises Arabic, Urdu, or Farsi, wherein the Latin-based language comprises English, French, Spanish, German, or Italian.

19. The method of claim 15, further comprising:
inserting one or more separation markers between the index values of the non-Latin-based characters and the Latin-based characters in the pseudo text.

20. The method of claim 15, wherein the step of encoding comprises:
   encoding the index values in the matrix-code symbol; and
   converting the Latin-based characters in the pseudo text to Unicode values and ASCII values, which are encoded in the matrix-code symbol.

\* \* \* \* \*